(12) United States Patent
Blad et al.

(10) Patent No.: US 10,823,175 B2
(45) Date of Patent: Nov. 3, 2020

(54) PUMP ASSEMBLY AND HYDRAULIC SYSTEM

(71) Applicant: GRUNDFOS HOLDING A/S, Bjerringbro (DK)

(72) Inventors: Thomas Blad, Bjerringbro (DK); Peter Mønster, Randers (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 79 days.

(21) Appl. No.: 15/767,500

(22) PCT Filed: Oct. 10, 2016

(86) PCT No.: PCT/EP2016/074127
§ 371 (c)(1),
(2) Date: Apr. 11, 2018

(87) PCT Pub. No.: WO2017/063970
PCT Pub. Date: Apr. 20, 2017

(65) Prior Publication Data
US 2018/0291908 A1     Oct. 11, 2018

(30) Foreign Application Priority Data
Oct. 12, 2015   (EP) .................................... 15189320

(51) Int. Cl.
*F04D 15/00*       (2006.01)
*F04D 29/42*       (2006.01)
(Continued)

(52) U.S. Cl.
CPC ..... *F04D 15/0016* (2013.01); *F04D 15/0066* (2013.01); *F04D 29/4293* (2013.01);
(Continued)

(58) Field of Classification Search
CPC ............. F04D 15/0016; F04D 15/0066; F04D 29/4293; F04D 29/48; F04D 29/486; F24D 3/02; F24D 3/105; F16K 11/048
(Continued)

(56) References Cited

U.S. PATENT DOCUMENTS 1,919,430 A  *  7/1933  Hewitt ................... F16K 11/048
                                                   137/454.6
4,872,809 A  *  10/1989  Addie ....................... F04D 7/04
                                                   415/206
(Continued)

FOREIGN PATENT DOCUMENTS

DE         90 13 992 U1   10/1991
DE         195 40 816 A1    5/1997
(Continued)

OTHER PUBLICATIONS

EP-0394140-A1 Machine Translation, Oct. 1990, [Received Sep. 2019]. (Year: 1990).*
(Continued)

*Primary Examiner* — Christopher Verdier
*Assistant Examiner* — Elton K Wong
(74) *Attorney, Agent, or Firm* — McGlew and Tuttle, P.C.

(57) ABSTRACT

A pump assembly includes an impeller (18), which for rotation is connected to an electrical drive motor (20) which can be driven in two rotation directions (A, B) and a valve (10) situated in an inlet of the pump assembly. The valve includes a valve element (48) movable between at least two switch positions and is connected for movement to a drive element (36, 60) subjected to the flow produced by the impeller (18). The valve element (48), in at least a first of the two switch positions, closes an inlet channel (44, 46) of the pump assembly (12) and is arranged such that the movement direction into this first switch position corresponds to the
(Continued)

flow direction (S1, S2) through this inlet channel (44, 46). A hydraulic system is provided with two circuits and such a pump assembly. The valve serves as a switch-over valve between the two circuits.

20 Claims, 12 Drawing Sheets

(51) Int. Cl.
*F04D 29/48* (2006.01)
*F24D 3/02* (2006.01)
*F24D 3/10* (2006.01)
*F16K 11/048* (2006.01)

(52) U.S. Cl.
CPC .......... *F04D 29/486* (2013.01); *F16K 11/048* (2013.01); *F24D 3/02* (2013.01); *F24D 3/105* (2013.01); *F24D 2220/0207* (2013.01); *F24D 2220/0235* (2013.01)

(58) Field of Classification Search
USPC ........................................................ 415/911
See application file for complete search history.

(56) References Cited

U.S. PATENT DOCUMENTS

| | | | | |
|---|---|---|---|---|
| 5,586,862 A | * | 12/1996 | Danner | ............... F04D 15/0016 |
| | | | | 415/146 |
| 2003/0150498 A1 | * | 8/2003 | Williams | ............ F15B 13/0405 |
| | | | | 137/625.65 |
| 2006/0165523 A1 | * | 7/2006 | Rozario | ................ F04D 29/126 |
| | | | | 415/206 |

FOREIGN PATENT DOCUMENTS

| | | | |
|---|---|---|---|
| DE | 196 36 855 C1 | 4/1998 | |
| EP | 0 394 140 A1 | 10/1990 | |
| EP | 0394140 A1 * | 10/1990 | ......... F04D 15/0016 |
| FR | 26 46 217 A1 | 10/1990 | |

OTHER PUBLICATIONS

EP-0394140-A1 Translation, Oct. 1990, [Received Oct. 2019]. (Year: 1990).*

* cited by examiner

PUMP ASSEMBLY AND HYDRAULIC SYSTEM

CROSS REFERENCE TO RELATED APPLICATIONS

This application is a United States National Phase Application of International Application PCT/EP2016/074127, filed Oct. 10, 2016, and claims the benefit of priority under 35 U.S.C. § 119 of European Application 15 189 320.3, filed Oct. 12, 2015, the entire contents of which are incorporated herein by reference.

FIELD OF THE INVENTION

The invention relates to a pump assembly as well as to a hydraulic system with such a pump assembly.

BACKGROUND OF THE INVENTION

A pump assembly whose impeller can be driven in two directions by a drive motor is known for example from FR 26 46 217, wherein a valve in the inlet channel of the pump assembly is switched in dependence on the rotation direction, in order to switch between two flow paths. For this, a movable flap which is subjected to the flow produced by the impeller is arranged in the pump chamber in the peripheral region of the impeller. The flow direction in the peripheral region of the impeller changes depending on the rotation direction of the impeller, and the flap moves between two switch positions. This flap via a coupling moves a valve element which can be moved between two valve seats, wherein one valve seat is situated on a first inlet channel and a second valve seat on a second inlet channel. It is therefore possible to switch over between two flow paths at the inlet side of the pump assembly. The disadvantage of this design is the fact that relatively large forces must be exerted by the flow onto the flap, in order to hold the valve in its respective switch position.

SUMMARY OF THE INVENTION

With regard to this problem, it is an object of the invention, to improve a pump assembly with a valve, to the extent that reduced actuation forces and holding forces are achieved.

The pump assembly according to the invention is configured as a centrifugal pump assembly and comprises an impeller which is connected to an electrical drive motor which can be driven in two rotation directions and can therefore rotate the impeller in two rotation directions. The drive motor for this comprises a suitable control device which activates the drive motor such that the desired rotation direction can be selected. The pump assembly according to the invention moreover comprises a valve in the inlet channel, said valve being actuated or switched by way of the flow produced by the impeller. The valve is preferably arranged directly on the pump casing, wherein a valve element of the valve and the associated valve seats are preferably arranged in a valve space or valve housing, which is separated from the interior of the pump casing, in which the impeller rotates. The valve housing however can be configured as one piece with the pump casing, for example as a molded part, in particular as an injection molded part of plastic.

The valve is situated in the inlet of the pump assembly, i.e. at the suction side of the pump assembly. The valve comprises at least one valve element which is movable between at least two switch positions. Thereby, the valve element comes to sealingly bear on the valve seat, preferably in at least one of the switch positions. Particularly preferably, the valve element can be sealingly brought to bear on two valve seats in a selective manner. The movement of the valve element is effected by the flow produced by the impeller. A drive element is present for this, upon which the flow produced by the impeller acts in the inside of the pump casing. The flow in the inside of the pump casing changes in dependence on the rotation direction of the impeller which is caused by the drive motor, so that the drive element is moved in dependence on the rotation direction of the impeller. The drive element is connected or coupled to the valve element in a force-transmitting manner, so that the valve element is moved by the drive element. The valve element is thus moved via the drive element in dependence on the rotation direction of the impeller. Spaces, in which the valve element and the drive element are situated, are separated from one another, due to the fact that the valve lies on the inlet side and the drive element is to be actuated by the exit-side flow of the impeller, since a pressure difference exists between them on operation of the pump assembly. The drive element lies on the delivery side, whereas the valve element is situated on the suction side of the impeller. The connection between the drive element and the valve element is thus preferably led in a movable seal through a wall which separates the two spaces from one another. Alternatively however, a magnetic coupling through a closed wall is also possible.

According to the invention, the valve element is arranged such that it can be automatically held in at least one of the two switch positions by way of the hydraulic pressure which is produced by the pump assembly. For this, the valve element is arranged in a manner such that it closes an inlet channel of the pump assembly in at least a first of the two switch positions, wherein the movement direction into this first switch position corresponds to the flow direction through this inlet channel. This means that for closing the inlet channel, the valve element is not moved against the flow in the inlet channel, so that lower actuation forces are necessary. Moreover, the flow prevailing in the inlet channel or a pressure prevailing in the inlet channel acts upon the valve element such that it is pressed into the closed switch position, in particular is pressed against a valve seat. The valve is thus held in the closed switch position by way of the pressure in the inlet channel. I.e. a self-holding function is created and the forces which are to be mustered by the drive element can be reduced. This likewise has advantages with regard to the necessary lever ratios between the drive element and the valve element.

The drive motor is preferably an electronically controlled or regulated drive motor which can be changed in its speed. Thus the electric drive motor particularly preferably permits the impeller to be driven with different accelerations. It is also possible for the impeller to be driven in the two rotation directions at different speeds and/or accelerations. On starting up, it is therefore possible to accelerate the impeller such that a flow acting upon the drive element and initiating the movement of the valve element is built up more rapidly than a pressure which effects the self-holding function of the valve element, by way of this.

The pump assembly is preferably configured as a circulation pump assembly, in particular as a heating circulation pump assembly. Such a circulation pump assembly can preferably comprise a wet-running, electrical drive motor. The circulation pump assembly delivers fluid, in particular water, in a circuit, wherein the fluid at the pressure side exits out of the pump assembly through an outlet into a hydraulic system and is delivered by the hydraulic system in the circuit to the inlet channel of the pump assembly, i.e. to the suction side. If the inlet channel is closed by the valve element, then a pressure produced by the pump assembly, via the connected hydraulic circuit also acts in the inlet channel upon the valve element and can thus hold this in its closed switch position.

According to a preferred embodiment, the pump assembly comprises two inlet channels and the valve is configured as a switch-over valve between the two inlet channels. The two inlet channels are arranged on the suction side of the pump assembly, i.e. the impeller sucks fluid or water from the inlet channels. Such a pump assembly can be arranged in a hydraulic system, in which a hydraulic circuit comprises two part-circuits or two branches which branch from one another at the delivery side of the pump assembly and run out in each case into one of the two inlet channels. Thus the switch-over valve can guide the flow produced by the impeller, through one of the branches of the hydraulic circuit, depending on the switch position. Such an arrangement can be applied for example in a heating installation which is used for heating a building as well as for heating service water. A branch of the hydraulic circuit can be configured as a heating circulation which is led through a building or radiators or heating bodies which are arranged in the building, in such an installation. The other branch then represents a branch which is led through a heat exchanger for heating service water. One can switch between these two circuits or two branches by way of the valve, and thus selectively, the building can be heated, or the service water heated. One can thus make do without a separate drive for the switch-over valve since the valve in the pump assembly according to the invention is switched over by the pump assembly by way of changing the rotation direction. In one rotation direction, the valve switches such that the water is led through the heating circuit. In the other rotation direction, the valve switches into the second switch position, in which the water is led through the heat exchanger for the heating of the service water.

The valve as a switch-over valve is also preferably configured such that it is automatically held in each switch position by way of the hydraulic pressure. Preferably, the at least one valve element in a first switch position closes a first inlet channel and in the second switch position closes a second inlet channel, wherein the at least one valve element is arranged such that its movement direction into the first switch position corresponds to the flow direction through the first inlet channel, and its movement direction into the second switch position corresponds to the flow direction through the second inlet channel. Thus, on closure of each inlet channel, one succeeds in the valve always being moved with the flow, which is to say in the flow direction, so that it does not need to be moved against the flow or a pressure in the inlet channel. Moreover, the pressure in the respective inlet channel acts such that the valve can be held in its closed position by the pressure, in particular the valve element is pressed against an associated valve seat. If the two circuits of the hydraulic system branch from one another at the delivery side of the pump assembly in the previously described manner and each circuit or branch runs out into one of the inlet channels, then the hydraulic pressure is transmitted from the exit side of the pump assembly also into the just closed circuit and there in the associated inlet channel acts in flow direction upon the valve element which is arranged there, so that this is pressed into its closed switch position or is held in its closed switch position, by way of the pressure. This has the advantage that the drive element is relieved, and the necessary holding forces do not have to be mustered by the drive element and the flow produced by the impeller.

According to a further preferred embodiment, the valve element comprises two sealing surfaces and the valve comprises two associated sealing seats, of which a first valve seat is situated in the first inlet channel and a second valve seat in the second inlet channel, wherein the two valve seats are preferably away from one another. The alignment of the valve seats which is away from one another preferably means that the valve seats are directed in opposite directions, and in particular the closure directions of the valve elements or the valve element on the two valve seats are directly oppositely to one another. However, and arrangement at an angle <180° is also possible. The valve element with its two sealing surfaces is preferably configured such that when a first sealing surface sealingly bears on the first valve seat, the second sealing surface is simultaneously lifted from the second valve seat and this is thus opened. Sealing surfaces and valve seats are preferably moreover configured such that the pressure prevailing in the respective inlet channel presses the sealing surfaces against the associated sealing seat when the sealing surface bears on the valve seat.

According to a further preferred embodiment, at least one sealing surface of the valve element and/or a valve seat, on which the valve element or its sealing surface comes to bear, is configured in a manner such that the valve element can move further in the movement direction by a certain amount after contact on the valve seat. This can be achieved for example by way of the valve element being elastically deformable at least in the region of the sealing surface and/or the valve seat. An improved sealing can thus be achieved.

Particularly preferably, the valve element is connected to the drive element in a manner such that the drive element is movable by way of movement of the valve element. I.e. the coupling between the valve element and the drive element is such that not only can the drive element, as a driving element, move the valve element, but that conversely, the valve element as a driving element can also move the drive element. If a restoring element such as a restoring spring engages on the valve element, in order for example to move this into an idle position given a standstill of the pump assembly, then the drive element can also be simultaneously moved into a defined idle position in this manner. Moreover, this arrangement has the advantage that if, as described beforehand, the valve element after reaching the closure position is moved further by a certain amount due to the pressure impingement of this, this further movement is likewise transmitted onto the drive element. The drive element can then be actively moved out of the flow path by way of the movement caused by the valve element, in order to reduce the flow resistance.

The valve element can be moved between the two switch positions in a linear manner or in a manner pivotable about a pivot axis. In the case of a switch-over valve, the valve element preferably comprises two sealing surfaces, of which in each case one can be brought into contact with a valve seat. However, with a switch-over valve, it is also conceivable to use two separate valve elements which are coupled to one another in their movement in a suitable manner. With a linearly movable valve element, the valve seats in the case of a switch-over valve are preferably directed diametrically opposite and are away from one another. The connection of the two sealing surfaces thus extends through the valve seats or their openings.

The drive element preferably comprises an onflow surface which is situated in an outlet channel of a pump casing surrounding the impeller. Thereby, the onflow element or the onflow surface of the drive element is preferably situated such that it is situated outside an annular space surrounding the impeller in the pump casing. I.e. preferably a distance is given in the radial direction, between the drive element or its onflow surface and the outer periphery of the impeller, so that a flow can run through between the drive element and the outer periphery of the impeller. The arrangement of the onflow surface in the outlet channel has the advantage that the flow which is produced by the impeller, can be guided in a targeted manner via the outlet channel on or onto the onflow surface, in order to create a force on the drive element for its movement and, by way of this, to initiate the movement of the valve element.

The onflow surface is preferably formed by a flap which is pivotable about a pivot axis, and the flap is coupled to the valve element for its movement, e.g. via a connection element. The connection element is preferably led through a separating wall between the valve space, in which the valve is arranged and the inside of the pump casing. This separating wall separates the delivery sides and suction sides, which is to say the outlet and the inlet of the pump assembly from one another. The pivotable flap in particular can be arranged in the outlet of the pump assembly such that it is impinged by the flow at different sides depending on the rotation direction of the impeller, so that it pivots in one direction or in the other opposite direction, in dependence on the rotation direction. The connection element between the flap and the valve element can be led through a separating wall between the pump chamber and the valve space either such that the rotation axis or pivot axis extends transversely to the separating wall or is situated parallel to this separating wall. If the pivot axis or rotation axis extends transversely to the wall, then a dynamic sealing is preferred in the region of the feed-through, for example a shaft seal. If the pivot axis or the rotation axis extends parallel to the wall, then a connection element can be led through the wall, so that an elastic element such that a rubber sleeve or elastomer sleeve can be used for sealing.

The flap is preferably arranged in an outlet channel of the pump casing such that the flap is impinged on a first surface by the flow produced by the impeller, given a first rotation direction of the drive motor, and is impinged on a second surface which is away from the first surface, given a second opposite rotation direction of the drive motor. The outlet channel is preferably configured such that it widens towards the inside of the pump casing, i.e. facing the impeller, so that the flows which are directed in the peripheral direction which is to say in the tangential direction can enter into the outlet channel in an as unhindered as possible manner. The outlet channel is preferably configured symmetrically in a manner such that the flow guidance is effected equally well in both rotation and flow directions, since this is to be the case for both rotation directions.

The pivot axis of the flap further preferably extends parallel to the rotation axis of the impeller. This means that the pivot movement of the flap or the pivot direction lies in a plane transverse to the rotation axis of the impeller. This means that the flap can be subjected to onflow quite well in two different directions, depending on the rotation direction, in which the impeller rotates. It is to be understood that the flap can also be configured such that it is rotatably mounted. The flap, alternatively or additionally to this can also be configured in a bendable, in particular elastically bendable manner. In this context, a bending region or a bending axis is also to be understood as a pivot axis. However, in any case, it is necessary by way of suitable transmission means to transmit the pivot movement of the flap onto the valve element for its movement, so that the flap can function as a drive element.

According to a particular embodiment of the invention, the pump casing comprises two outlet channel sections which are directed to the impeller in a manner such that the flow produced by the impeller is essentially guided into a first outlet channel section given a first rotation direction of the drive motor, and the flow which is produced by the impeller is guided essentially into a second outlet channel section given a second, opposite rotation direction of the drive motor, wherein the pivotable flap is preferably arranged in the first or in the second outlet channel section. This means that the other outlet channel section is preferably free of a flap in each case, so that the flow through this outlet channel is inhibited as little as possible. The flap is preferably arranged in that outlet channel section, which is predominantly subjected to flow given the rotation direction of the impeller or the drive motor which is used less often. In the case of a heating circulation pump assembly, as has been described above, this is preferably the rotation direction which is used in order to lead the heating water through the heat exchanger for service water heating. The outlet channels are preferably configured such that a flow which runs in the peripheral direction and along the inner peripheral wall of the pump casing preferably enters into one outlet channel section in each case, depending on the flow direction. The outlet channel sections preferably at the inner peripheral wall of the pump casing therefore branch radially outwards in the peripheral region of the impeller. Thereby, the outlet channel sections preferably extend in an arcuate manner, in order to permit a deflection of the flow out of the peripheral direction into the radial direction. Both outlet channels then run out further downstream, preferably into a common outlet channel or outlet connection piece of the pump assembly.

According to a preferred embodiment, both outlet channel sections can be separated from one another by a separating wall or separating element. This separating wall or this separating element thereby lies at the downstream end of the outlet channel sections. The separation of the outlet channel sections preferably stops further downstream, so that these unify into a common outlet channel. Such a separating wall or separating element improves the flow guidance in the transitions region between the interior of the pump casing which surrounds the impeller, and the outlet channel.

According to a further preferred embodiment, the valve element and the drive element have a defined idle position or a defined idle region, wherein preferably restoring means are present which subject the drive element and/or the valve element to a force which is directed into the idle position. This force on operation of the pump assembly is preferably overcome by the produced flow force, so that the valve element can be moved out of its idle position into one or more possible switch positions. The flow force drops if the pump assembly is switched off or the speed reduces below a certain limit, and the force which is produced by the restoring means moves the valve element and/or the drive element again into the idle position. The restoring means can for example be a spring element. Alternatively or additionally, the drive element and/or the valve element can be elastically deformed, so that elastic restoring forces move the valve element and/or the drive element back again into the idle position. In this case, the restoring means is thus formed by the elasticity of the drive element and/or of the valve element.

The impeller is preferably arranged in a pump casing, whilst the valve element is arranged in a valve housing. The pump casing defines the pump chamber or the pressure chamber, in which the impeller rotates, and the valve housing defines a valve space in which the valve element is situated. The valve space lies in the inlet of the pump assembly, so that the suction-side pressure prevails there. The drive element is arranged in the pump casing, whilst the valve element is arranged in the valve housing. A force transmission element which couples the drive element and the valve element to one another is arranged between the two. This force transmission element, as described above, can be a connection element which is led through a wall between the pump casing and the valve housing. Alternatively, this can also be a magnetic force transmission element.

According to a particularly preferred further embodiment of the invention, the impeller in relation to the inner peripheral wall of a pump casing which surrounds the impeller and in which casing the impelled rotates, is dimensioned such that a free space, in particular a free annular space which surrounds the impeller is created between the outer periphery of the impeller and the inner periphery of the surrounding pump casing. Thereby, this free space is preferably configured larger than usual. The inner radius of the pump casing in the peripheral region of the impeller is preferably at least 1.4 times, further preferably 1.5 times and yet further preferably at least 2 times as large as the radius of the impeller. Particularly preferably, the inner radius of the pump casing is between 1.5 and 3.5 and further preferably between 1.75 and 2.25 as large as the radius of the impeller. The radius of the pump casing thereby defines the distance between the inner peripheral wall of the pump casing and the rotation axis of the impeller. The inner periphery of the pump casing does not have to be circular, but can also vary over the periphery with regard to its distance to the rotation axis (radius). The mentioned radius ratio in particular is given over the whole periphery of the impeller, i.e. in a peripheral region of 360° with respect to the rotation axis of the impeller. Alternatively, such a radius ratio can also only be given in a peripheral section <360°, so that a free space is given between the outer periphery of the impeller and the inner periphery of the pump casing. This for example can be a peripheral section <180°, further preferably <90° or further preferably <45°. This peripheral section with the enlarged free space between the impeller and the pump casing is particularly preferably adjacent to an outlet of the pump casing. The free space favors the flow, so that a high efficiency can be achieved in particular in both rotation directions, even if the impeller is optimized for one rotation direction. Particularly preferably, such a distance between the impeller and the pump casing is given in the complete peripheral region, that a rotating fluid ring or water ring can form in the periphery of the impeller on operation of the pump assembly, and this improves the conversion of flow energy into pressure and preferably acts as a further pump stage. Therein lies the difference between this preferred embodiment and conventional centrifugal pump assemblies, in which it is indeed a rotation of fluid beyond the outlet which is to be prevented.

According to a preferred embodiment of the invention, the impeller comprises arcuate, blades, preferably blades which are arcuate in two directions, wherein the blades preferably have a curvature which is adapted to that rotation direction in which the impeller is predominantly operated. The rotation direction, in which the impeller is predominantly operated, is that rotation direction in which the pump assembly has the most operating hours. In the case of the use of a pump assembly in a heating installation, as has been described above, this is preferably that rotation direction, in which the pump assembly leads heating water through the heating circuit of a building. The arcuate configuration of the blades permits the optimization of the efficiency of the impeller for the predominant operating time. The efficiency can be worse in the opposite rotation direction which is used less. In particular, this however can be compensated by a certain amount by the free space between the outer periphery of the impeller and the inner periphery of the pump casing, such that an acceptable efficiency can still be achieved even with arcuate blades in the rearward rotation direction, i.e. counter to the curvature of the blades. This is particularly the case if the pump assembly is operated in the part-load range, i.e. given a relatively high installation resistance. The blades in particular are arcuate in the peripheral direction, but however can additionally be arcuate in the axial direction, i.e. in the direction parallel to the rotation axis. The flow guidance is improved due to the curvature of the blades.

The impeller further preferably has a diameter between 25 and 60 mm, wherein preferably the run-in diameter or suction port diameter is between 12 and 30 mm diameter. The operational speed of the drive motor is preferably >3,000 revolutions per minute, further preferably >5,000 revolutions per minute. The operating speed particularly preferably lies in the region between 3,000 and 7,000 revolutions per minute and can be varied in this speed range for the closed-loop control of the pump assembly. The pressure-quantity ratio of the pump assembly preferably lies above 3/1, further preferably 4/1. The pressure-quantity ratio can also be >5/1, up to 8/1. With regard to the pressure-quantity ratio, the pressure is based on the delivery head in meters and the quantity on the flow in cubic meters per hour. The specific speed $n_q$ preferably lies between 20 and 40, but can also be larger.

The subject matter of the invention, apart from the previously described pump assembly is moreover a hydraulic system with at least two hydraulic circuits, wherein one pump assembly according to the previous description is arranged in the hydraulic system, and the valve of the pump assembly is configured as a switch-over valve, by way of which the flow path for a fluid which is delivered by the pump assembly can be switched between the two hydraulic circuits. As described, the switch-over valve thereby lies at the suction side of the pump assembly, i.e. in the inlet channel of the pump assembly, in which fluid is sucked by the pump assembly. The two hydraulic circuits branch away from one another at the exit side of the pump assembly, i.e. in the delivery/pressure region. As described, with regard to the hydraulic system, it is preferably the case of a heating system, wherein one hydraulic circuit runs through a building and the other hydraulic circuit is the circulation through a heat exchanger for heating service water.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
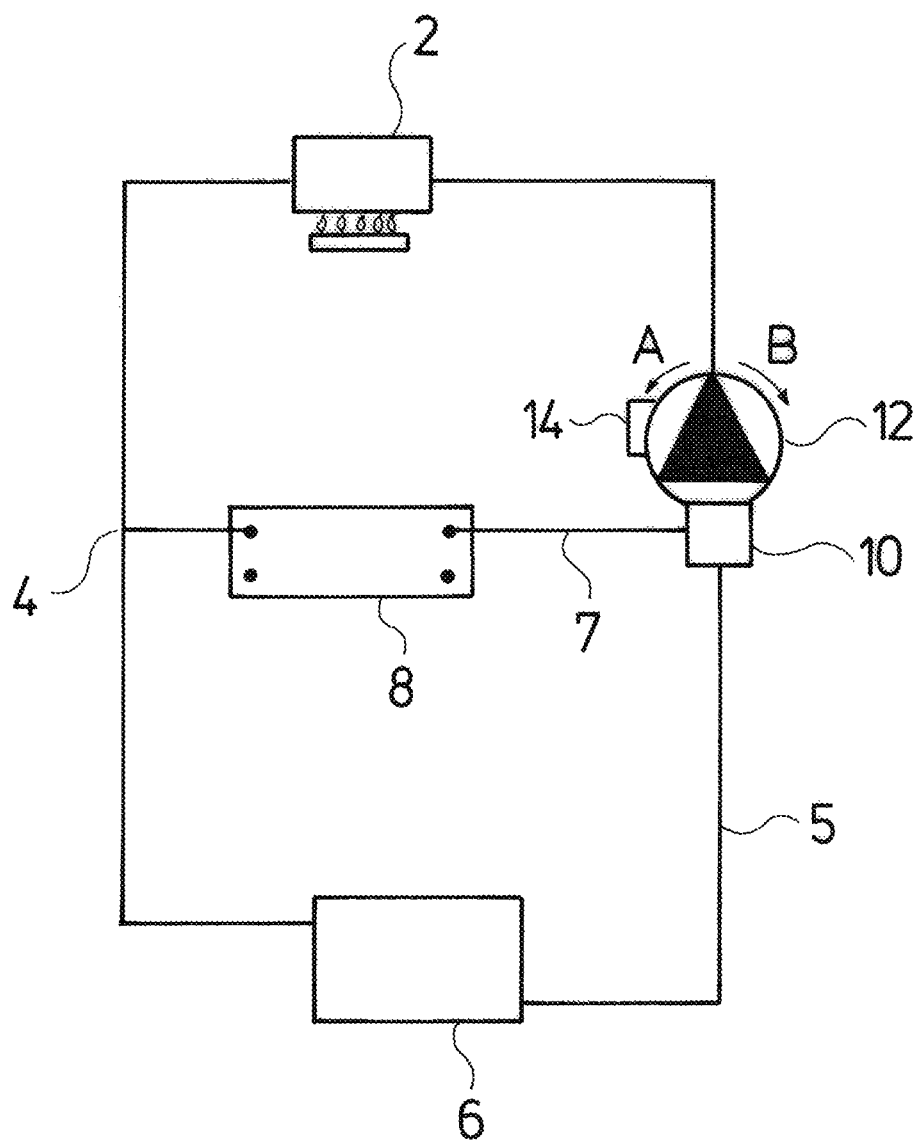
FIG. 1 is a schematic view of a hydraulic system according to the invention, with a first location of installation of the pump assembly.

Referring to the drawings, FIG. 1 shows a hydraulic system, in which a pump assembly according to FIGS. 2 to 12 can be applied. With regard to this hydraulic system, it is the case of a heating installation with two hydraulic circuits. The hydraulic system comprises a primary heat exchanger 2 which for example is heated by a combustion unit such as a gas or oil combustion unit. With regard to the primary heat exchanger 2, it is thus the case for example of a heating boiler, but it can also be the case of another suitable heat producer. A branching point 4, at which the circulation divides into two branches or circuits is situated downstream of the primary heat exchanger 2 in the flow direction. A first circuit 5 runs through a building for room heating and in this example is symbolized by a radiator 6. It is to be understood that this heating circuit 5 can also comprise more than one radiator 6 or also other heating conduits. The second hydraulic circuit 7 runs through a secondary heat exchanger 8 which serves for heating service water. The heating circuit 5 and the second circuit 7 run out into a valve 10 which is part of the pump assembly 12. The pump assembly 12 serves for delivering water through the two circuits 5 and 7, wherein only one of the circuits 5 and 7 is open whilst the other circuit is closed, depending on the switch position of the valve 10 configured as a switch-over valve. This means that on operation of the pump assembly 12, the water which is heated by the primary heat exchanger 2 is either delivered through the secondary heat exchanger 8 or through the radiator 6, depending on the valve position. What is essential is that the delivery-side pressure of the pump assembly 12, via the branching point 4 is also present in the circuit which is closed by the valve 10 in each case. With regard to the pump assembly 12, it is the case of a pump assembly, which can be operated via an electrical drive motor in two rotation directions. The rotation direction is set by a control device 14 which is integrated into the pump assembly 12. The control device 14 activates the electrical drive motor.

Figure 2:
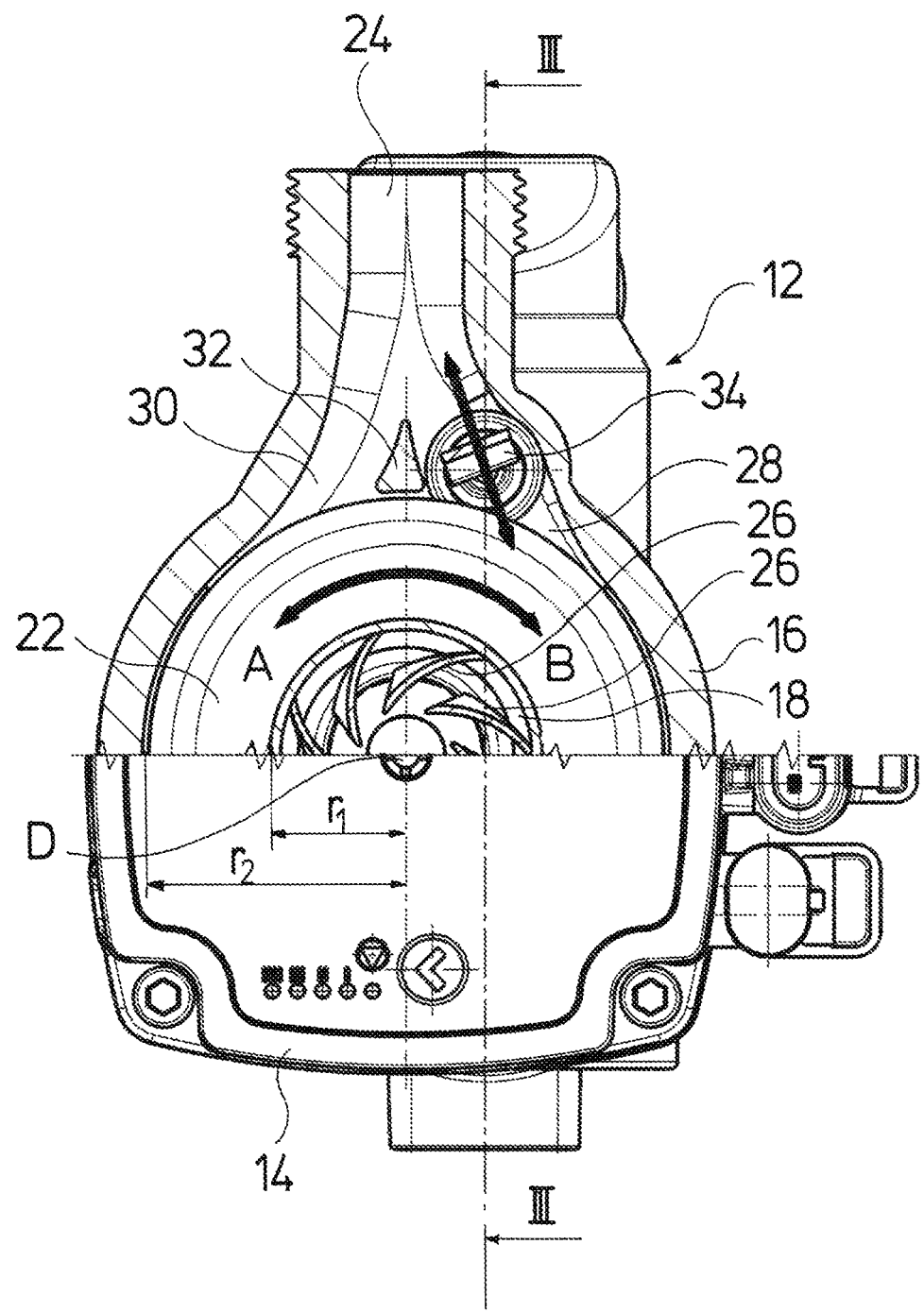
FIG. 2 is a partial sectional view of a pump assembly, according to a first embodiment of the invention.

A first embodiment for the pump assembly 12 with the valve 10 is described by way of FIGS. 2 to 6. FIG. 2 shows the pump casing 16 in a partly sectioned manner. A plan view of the electronics housing which accommodates the control device 14 is to be seen in the non-sectioned region. An impeller 18 is situated in the inside of the pump casing 16. This impeller is driven in rotation about the rotation axis D by the electrical drive motor 20. Thereby, the impeller can be selectively driven in the rotation directions A and B. The impeller 18 has a radius r1, whereas the inner diameter of the pump casing 16 in the peripheral region of the impeller 18 has a diameter r2. It is to be recognized that the inner diameter r2 of the pump casing 16 is significantly larger than the outer diameter r1 of the impeller. In the shown example, the radius of the pump casing r2 is roughly double the size of the radius r1 of the impeller 18. A free space in the form of an annular space 22 is created in the peripheral region of the impeller 18 in this manner, in which annular space a rotating water rings forms on rotation of the impeller 18, said water ring increasing in size in the radial direction during rotation, until the flow enters into the outlet channel 24. The rotating water ring thereby favors the conversion of flow energy, which is to say speed of the fluid exiting the impeller 18, into pressure.

The impeller 18 comprises arcuate blades 26 which are arcuate in the direction of the rotation axis D as well as in the peripheral direction. In this case, the blades 26 are arcuate such that they are optimized for the rotation direction A. This means that the impeller achieves the optimal efficiency on rotation in the direction A. The impeller however also achieves an acceptable efficiency in the rotation direction B despite the blades 26 which are not correctly curved for this rotation direction, on account of the free space 22.

The outlet channel 24 adjacent to the interior of the pump casing 16 comprises two outlet channel sections 28 and 30. The outlet channel sections 28 and 30 are separated from one another by a separating element 32 or a separating wall 32, which is triangular in cross section. The outlet channel sections 28 and 30 unify into the outlet channel 24, downstream of the separating element 32. If the impeller 18 rotates in the rotation direction A, then the fluid or the water will likewise rotate in the direction A in the outer peripheral region of the impeller 18 in the annular space 22 and thus enter the outlet channel section 28 in the tangential direction, whereas significantly less water enters the outlet channel section 30. If the impeller 18 is operated in the reverse rotation direction B, then the fluid in the annular space 22 also rotates in the rotation direction B, so that the fluid then preferably enters into the outlet channel section 30.

A drive element in the form of a pivotable flap 34 is arranged in the outlet channel section 28. The flap is fastened on a lever 36 which extends through a seal 38 out of the inside of the pump casing 16 into the inside of a valve housing 40.

The valve housing 40 is arranged at the suction side of the pump assembly 12 and accommodates the valve 10. The inside of the valve housing 40 is in connection with a suction space and thus with the suction port of the impeller 18, via a connection 42 which is only schematically indicated. The valve housing 40 comprises two inlet channels 44 and 46, wherein the inlet channel 44 is connected to the heating circuit 5, and the inlet channel 46 to the second circuit 7 through the secondary heat exchanger 8.

Figure 3:
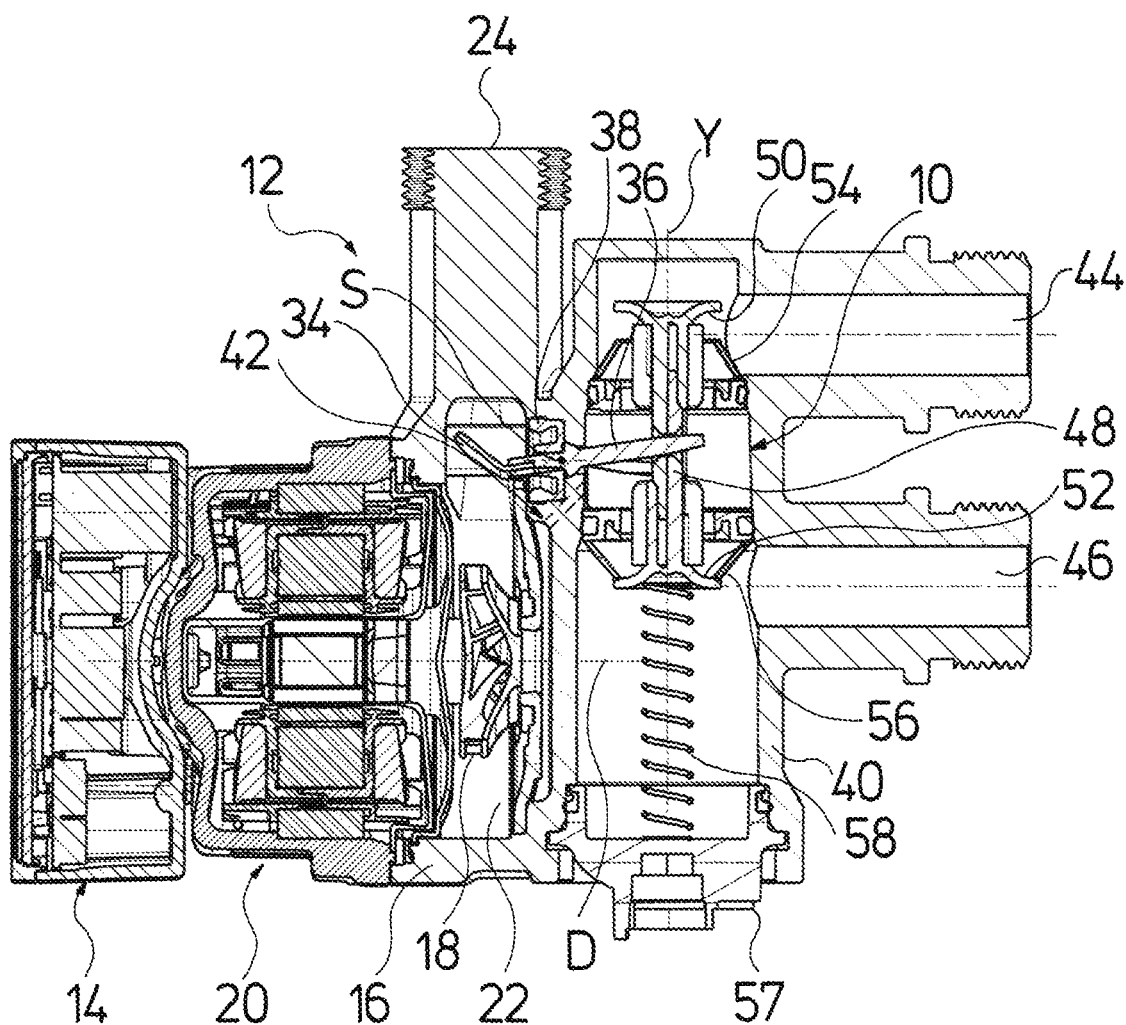
FIG. 3 is a sectional view of the pump assembly according to FIG. 2, along the line III-III in FIG. 2, wherein a valve in the pump assembly is situated in the idle position.
Figure 4:
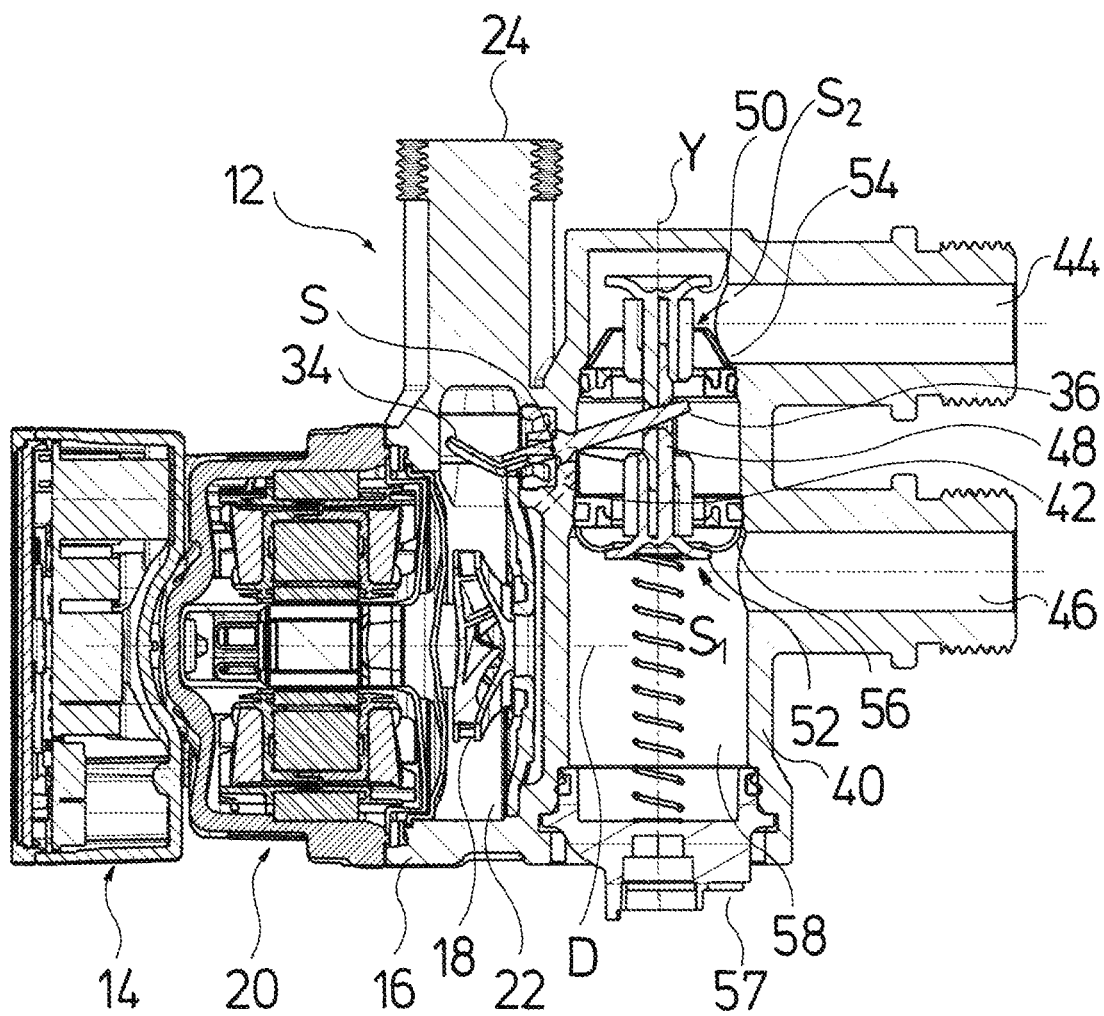
FIG. 4 is a sectional view according to FIG. 3, wherein the valve is situated in a first switch position.
Figure 5:
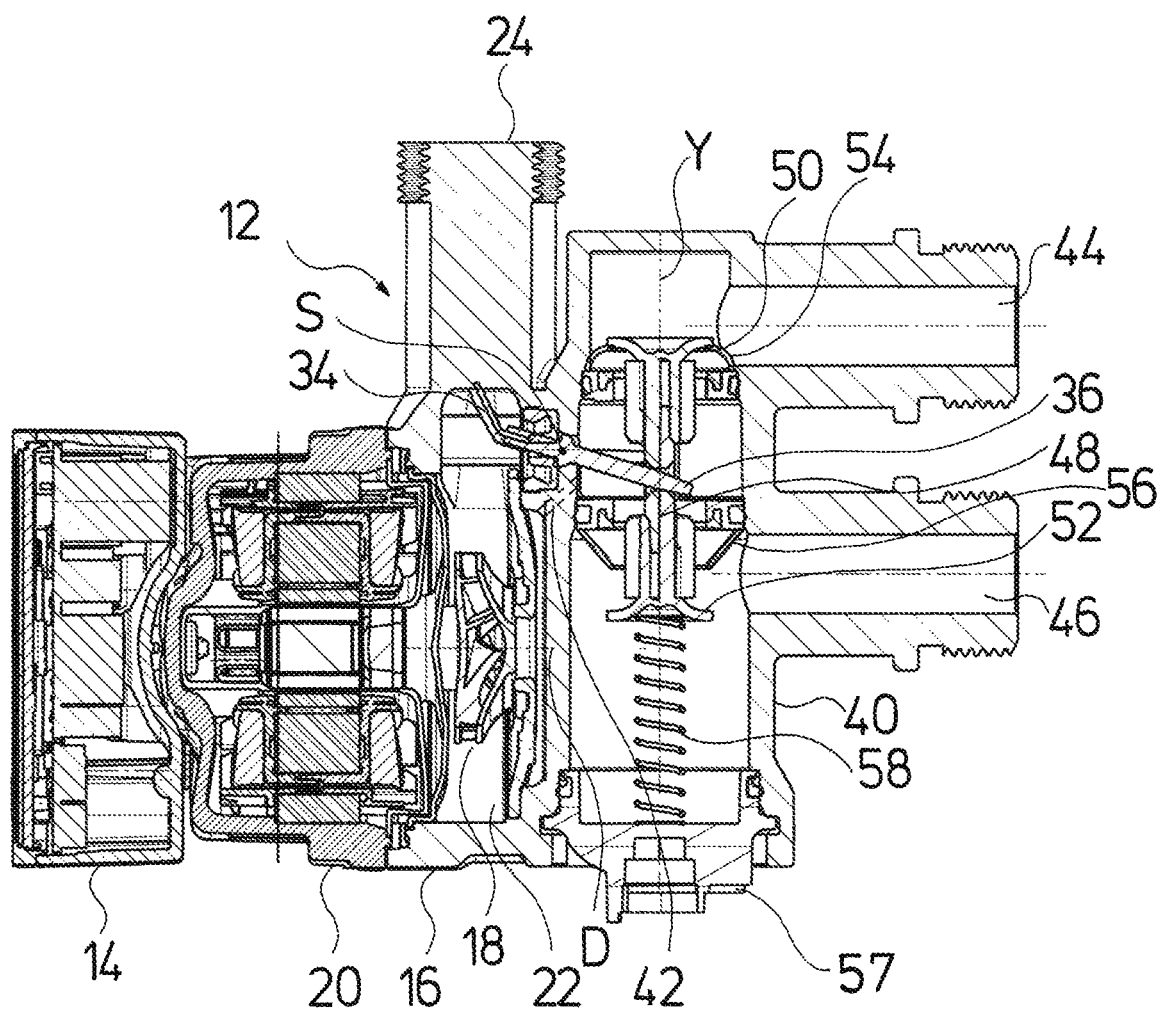
FIG. 5 is a sectional view according to FIGS. 3 and 4, wherein the valve is located in a second switch position.

The valve comprises a linearly movable valve element 48, wherein the lever 36 is engaged with the valve element 48 such that the valve element 48 is linearly displaced along the axis Y by way of a pivot movement of the lever 36 about its pivot axis S. The valve element 48 at its axial ends comprises two sealing surfaces 50 and 52 which face one another. Valve seats 54 and 56 face the sealing surfaces 50 and 52. Thereby, the first inlet channel 44 runs out on the first valve seat 54 and the second inlet channel 46 on the second valve seat 56. The sealing surface 50 can come into sealing contact with the valve seat 54, whereas the sealing surface 52 can come into sealing contact with the valve seat 56, as is shown in FIG. 3. The sealing surfaces 50, 52 are fixedly connected to one another via the valve element 48, so that if one of the sealing surfaces 50, 52 bears on its associated valve seat 54, 56, the respective other sealing surface 52, 50 is lifted from its valve seat 56, 54. In each case therefore, only one of the inlet channels 44 and 46 is connected to the suction port of the impeller 18 in fluid-leading manner via the connection 42.

FIG. 3 shows the idle position of the valve 48 which is held by a restoring spring 58. This idle position is the position of the valve element 58 given a standstill of the pump assembly. The second circuit 7 through the secondary heat exchanger 8 is closed in this position, since the inlet channel 46 is closed. If the drive motor 20 is set into operation from this idle position by way of a suitable activation via the control device 14, such that the impeller 18 rotates in the rotation direction B, then the rotating flow in the annular space 22 first and foremost is led into the outlet channel section 30, so that only a low flow force acts upon the flap 34, wherein this force is not sufficient for the flap 34 to move lever 36, in order to move the valve element 48. The water is thus delivered via the outlet channel section 30 into the outlet channel 34 and flows through the heating circuit 5 into the inlet channel 34. From there, it flows through the opened valve seat 54 via the connection 42 into the suction port of the impeller 18. The exit-side pressure of the pump assembly 12 is simultaneously also transmitted into the inlet channel 46 via the now closed second circuit 7. There, the pressure acts upon the face side of the valve element 48 which is to say the rear side of the sealing surface 52. Thereby, the valve seat 56 is deformed by a certain amount with respect to the idle position, since it is configured in an elastic manner, so that the valve element 48 can yet displace by a certain amount. The pressure acting through the inlet channel 46 upon the rear side of the sealing surface 52 during the operation of the pump assembly thus securely holds the valve element 48 in the shown first switch position, which serves for leading heating water through the heating circuit 5.

For this, it is essential that the valve element is configured such that it must be moved in the flow direction S1 towards the sealing seat 50 for closing the inlet channel 46. Conversely, the sealing surface 50 is moved in the flow direction S2 through the inlet channel 44 towards the valve seat 54, in order to close the valve seat 54. The valve element 48 extends through the valve seats 54 and 56 or the openings which are enclosed by the valve seats 54 and 65, so that the sealing surfaces 50 and 52 face one another, whereas the valve seats 54 and 56 are away from one another.

If the drive motor 20 is driven in the reverse rotation direction A, the fluid in the inside of the pump casing 16 in the annular space 22 is set into a rotation in the direction of the rotation direction A. The fluid now therefore predominantly flows into the outlet channel section 28, whereas less or essentially no flow is directed into the outlet channel section 30. The flap 34 at its surface which faces the impeller 18 and which forms an onflow surface is subjected to the flow by way of this, and this pivots the flap 34 about the pivot axis S, whereupon the lever 36 simultaneously linearly displaces the valve element 48 along the axis Y, wherein the sealing surface 52 disengages from the valve seat 56 and thus releases the first inlet channel 46. The drive motor is accelerated in the rotation direction A by a control device, preferably in a manner such that the flow pivoting the flap 34 sets in more rapidly than a pressure prevailing in the inlet channel 46 and acting upon the valve element 48. Thus one succeeds in the valve element 48 being able to be moved, before an adequate holding pressure builds up. The sealing surface 50 simultaneously comes to bear on the valve seat 54 and closes the first inlet channel 44. The fluid is therefore now delivered by the pump assembly 12 through the second circuit 7 and the secondary heat exchanger 8, whereas the heating circuit 5 is closed. However, the exit-side pressure of the pump assembly 12 is also transmitted via the branching point 4 through the closed heating circuit 5 into the first inlet channel 44, so that the pressure there acts upon the rear side of the sealing surface 50 or upon the face side of the valve element 48. The sealing surface 50 is pressed further against the valve seat 54 on account of this, and this valve seat deforms by a certain amount due to its elasticity. By way of this, the valve element 48 is displaced linearly to a greater extent than if it were to be displaced solely by the pivot movement of the flap 34 and of the lever 36. Thereby, the lever 36 is co-moved via the coupling, and the flap 34 is essentially pivoted out of the flow path through the outlet channel section 30, so that the flow resistance is minimized. If the pump assembly is switched off, then the pressure upon the face side of the valve element 48 which is formed by the rear side of the sealing surface 50 falls away, and the restoring spring 58 moves the valve element 48 back again into the initial position represented in FIG. 3.

Figure 6:
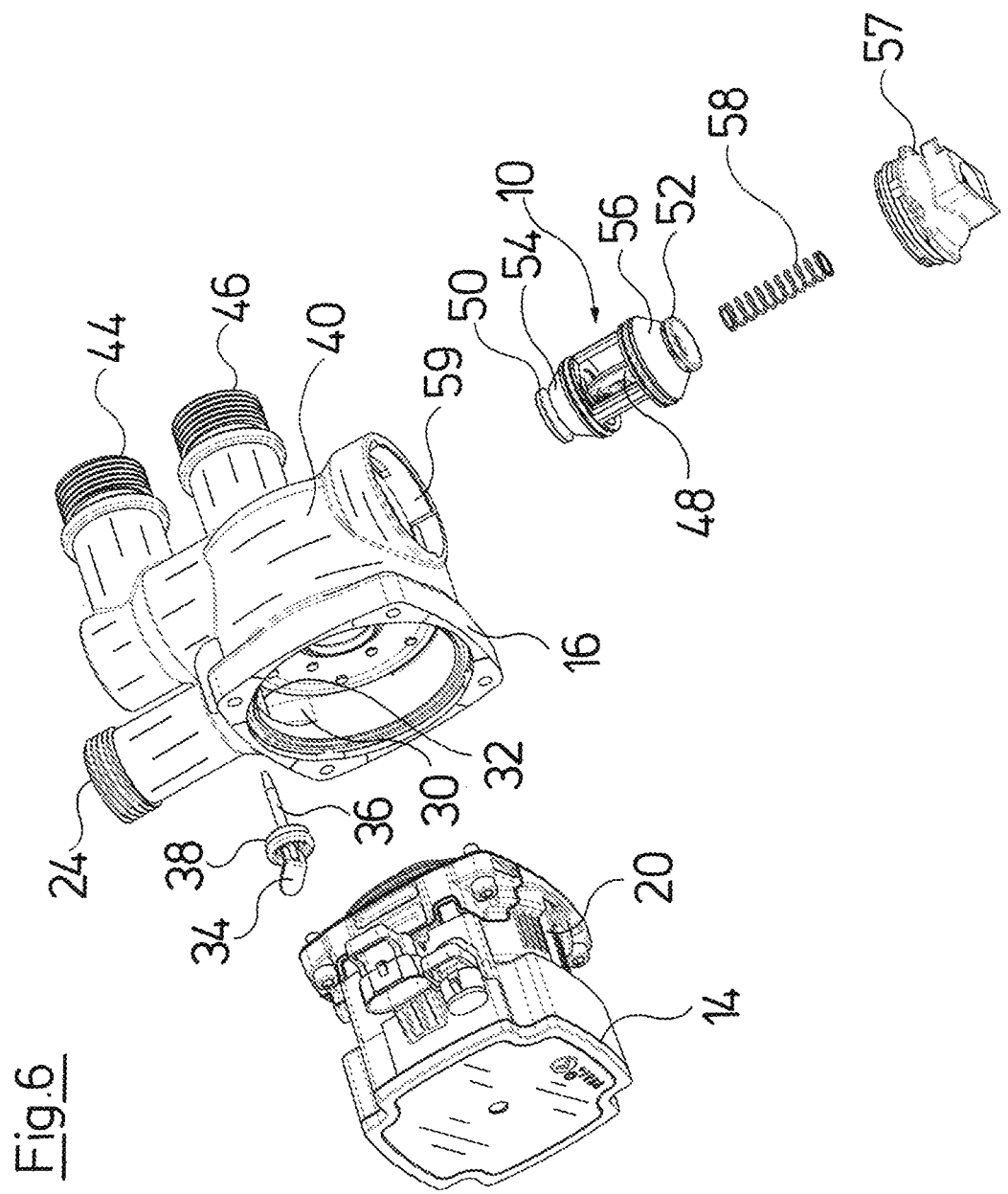
FIG. 6 is an exploded view of the pump assembly according to FIGS. 2 to 5.

FIG. 6 illustrates the assembly of the pump assembly 12. The pump casing 16 is configured as one piece with the valve casing 40. The valve 10 as an insert is inserted through an opening 59 which is subsequently closed by a cover 57, into the valve housing 40. The restoring spring 58 is supported at one end on the valve element 48 and at the opposite end on the inner side of the cover 57. The flap 34 with the lever 36 and the seal 38 can be inserted through the opening of the pump casing 16 which faces the drive motor 20, given removed drive motor 20.

FIGS. 7 to 12 show a variant of the pump assembly 12, as has been described beforehand. It is mainly the differences which are dealt with in the subsequent description.

The arrangement of the impeller 18 in the pump casing 16 with the surrounding annular space 22 corresponds to the configuration in the preceding embodiment example. In this embodiment example, the outlet channel 24 likewise widens to the interior of the pump casing 16, so that outlet channel sections 28 and 30 are formed, which however are not separated from one another by a fixed wall, but by a flap 60 which here serves as a drive element. The flap 60 comprises an onflow surface 62 at one side and a second onflow surface 44 at the opposite side. If the impeller 18 rotates in the rotation direction A, the flow is predominantly directed into the outlet channel section 28 and flows onto the onflow surface 64, whereas with a rotation of the impeller in the rotation direction B, the flow first and foremost is directed into the outlet channel section 30, and the onflow surface 62 is subjected to onflow. The flap 60 pivots about the pivot axis C in the direction b if the onflow surface 62 is subjected to onflow. The flap 60 is pivoted about the pivot axis C in the direction a if the onflow surface 64 is subjected to onflow.

Figure 7:
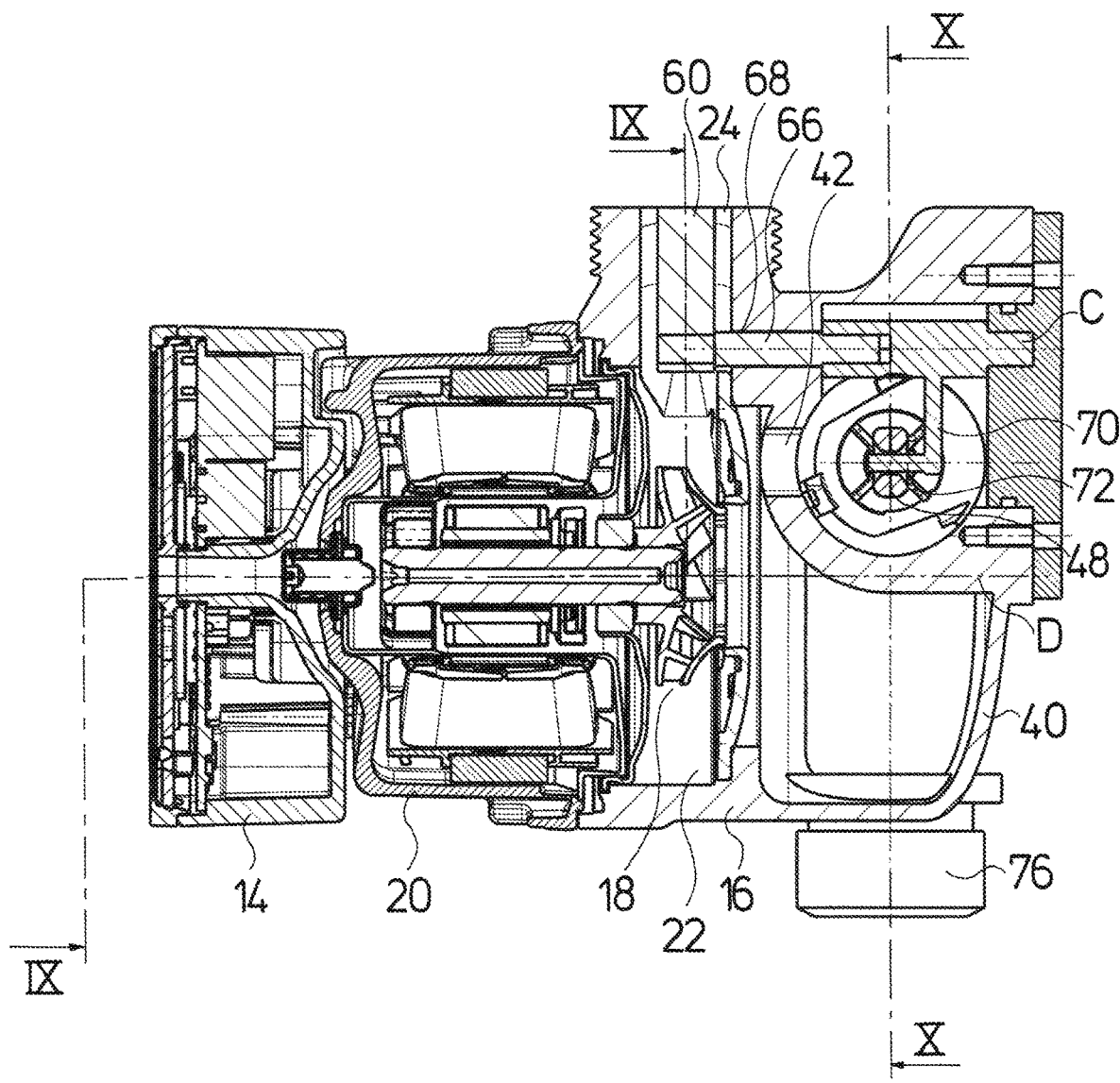
FIG. 7 is a sectional view of a pump assembly according to a second embodiment of the invention.
Figure 8:
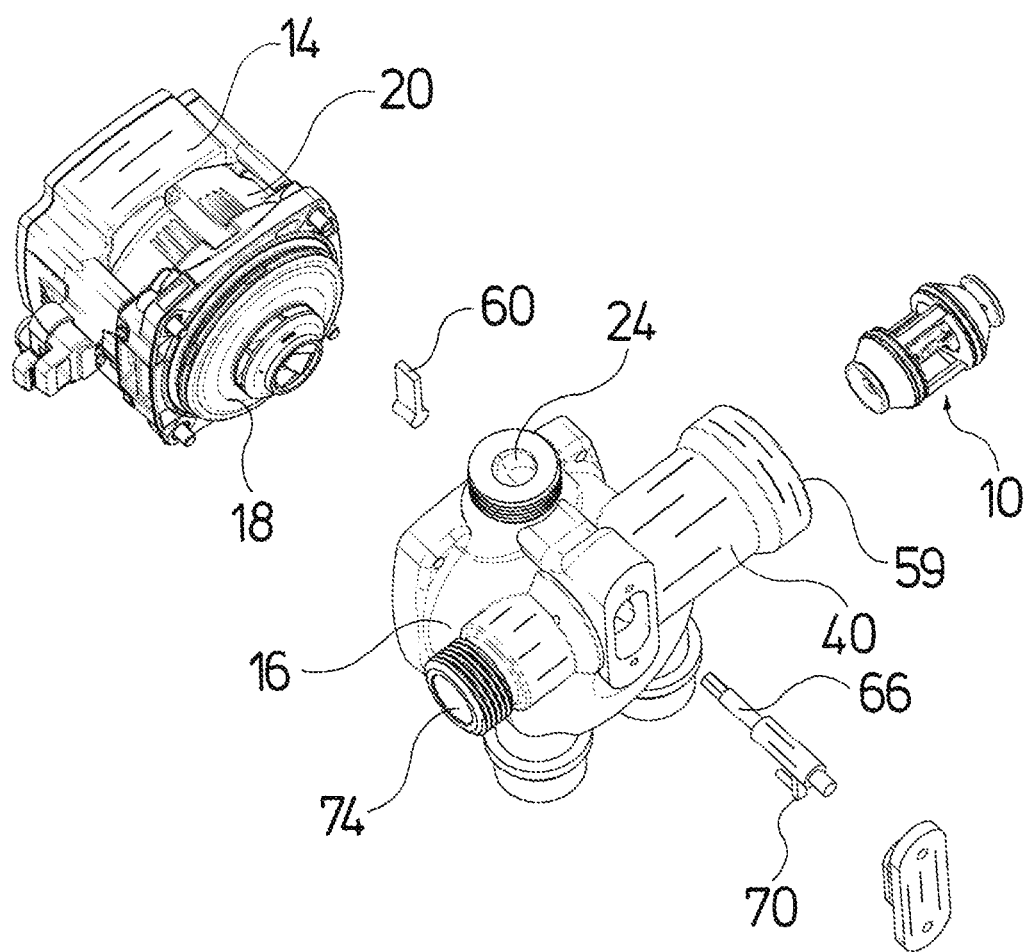
FIG. 8 is an exploded view of the pump assembly according to FIG. 7.

The flap 60 is connected in a rotationally fixed manner to a shaft 66 which extends through a shaft seal 68 into the valve housing 14. One can likewise make do without the shaft seal 68 if the fit in the feed-through for the shaft 66 is suitably selected and/or if a certain leakage can be tolerated as the case may be. In such a case, the shaft seal 56 is formed directly by the wall of the pump casing or of the valve housing 40. The shaft 66 in the valve housing 14 ends at a lever arm 70 which, departing from the shaft 66 extends diametrically oppositely to the flap 60 with respect to the pivot axis C. The lever arm 70 with a pin 72 engages into the valve element 48. Thus the lever arm 70 likewise pivot on rotation of the flap 60, by which means the valve element 48 is linearly displaced in the manner described above. The valve 10 with this embodiment however, as is to be seen in FIG. 8, is configured as an insert 10 which is inserted through the opening 59 into the valve housing 40. In this embodiment example, the valve housing 40 at the end which is opposite to the opening 59 yet comprises a connection 74 which is for assembly purposes and which is closed by a cap 76, as is shown in FIG. 7.

Figure 9:
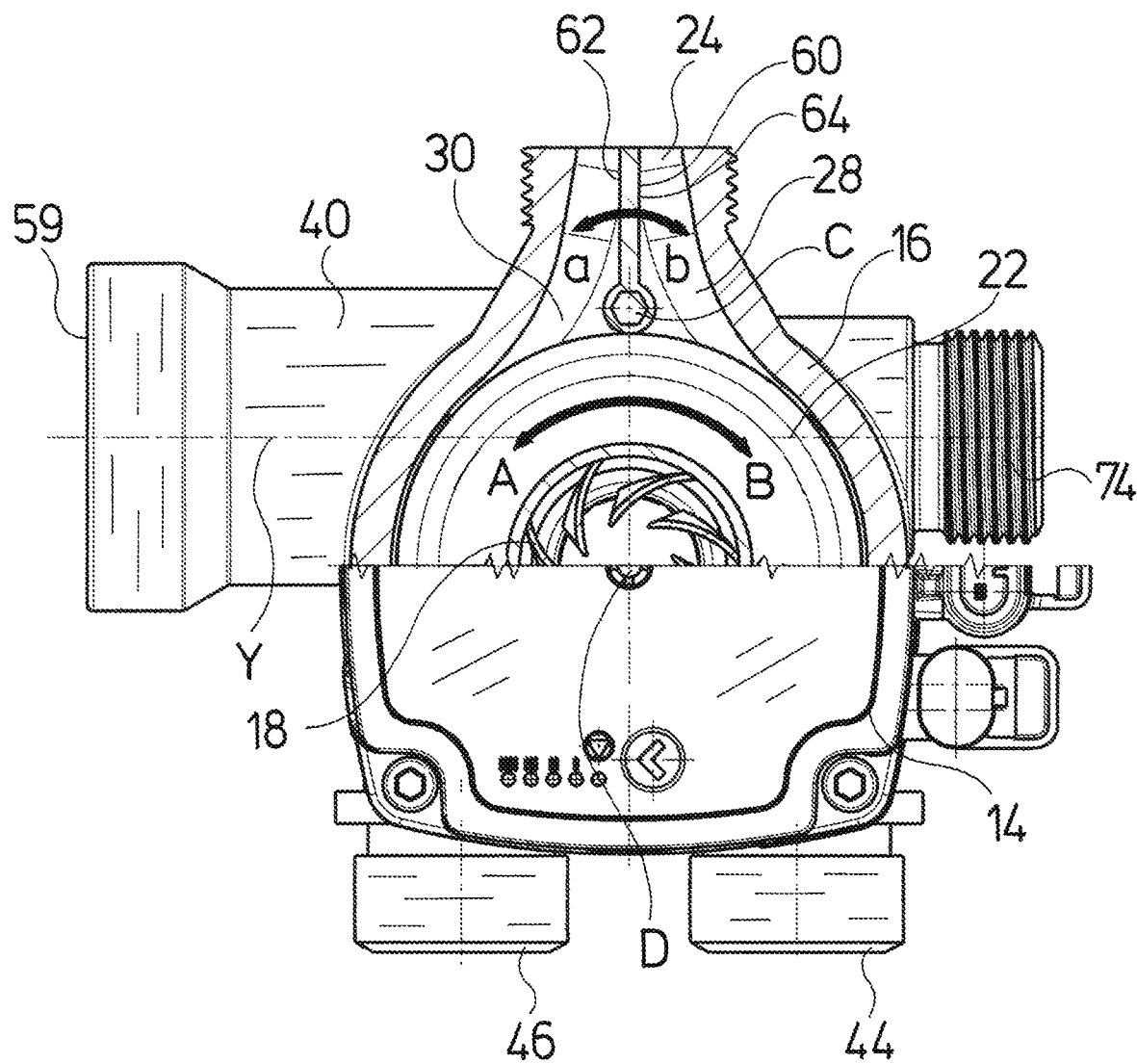
FIG. 9 is a sectional view along the line IX-IX in FIG. 7, wherein the drive element is situated in the idle position.
Figure 10:
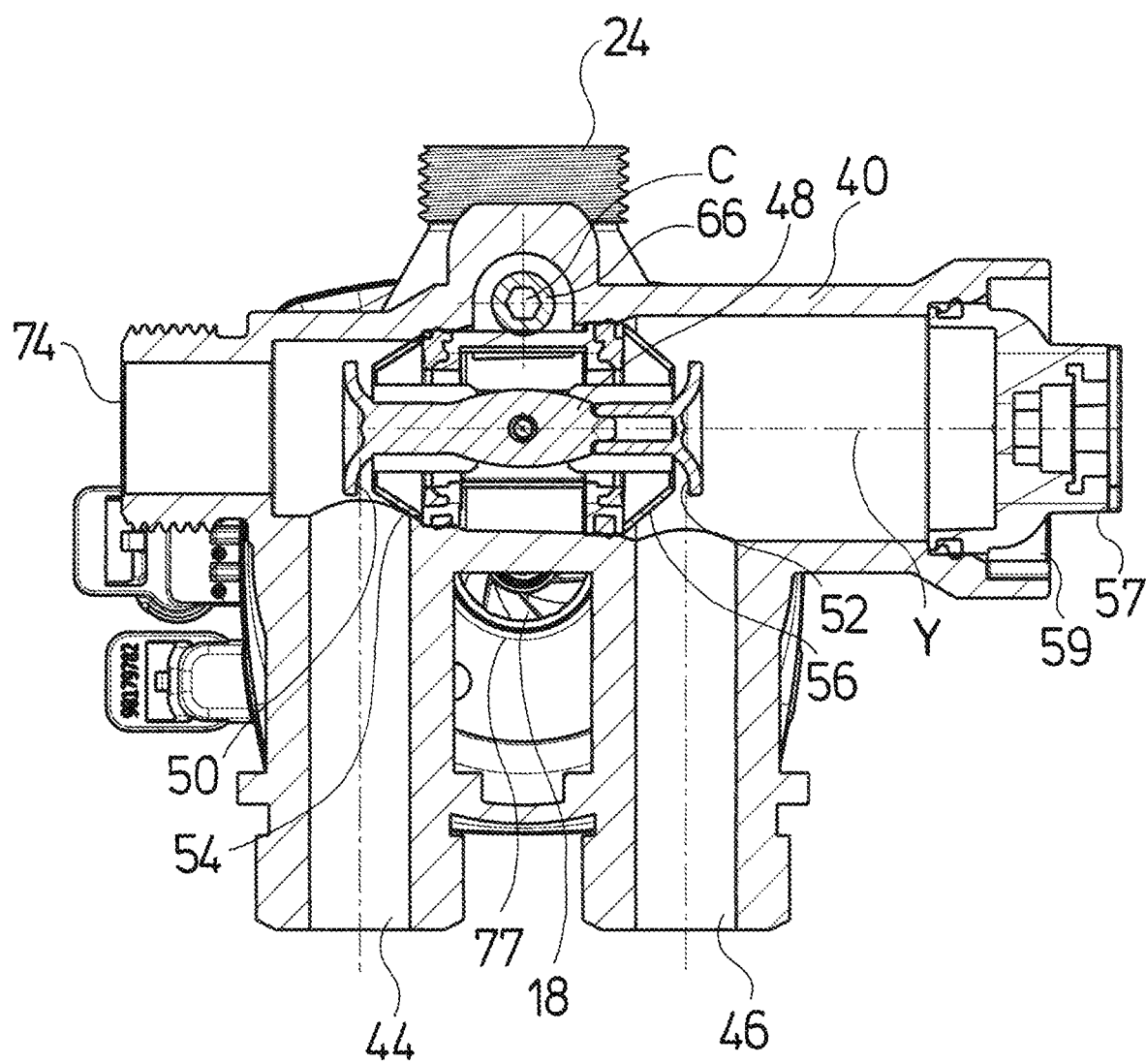
FIG. 10 is a sectional view along the line X-X in FIG. 7, wherein the valve element is situated in an idle position.
Figure 11:
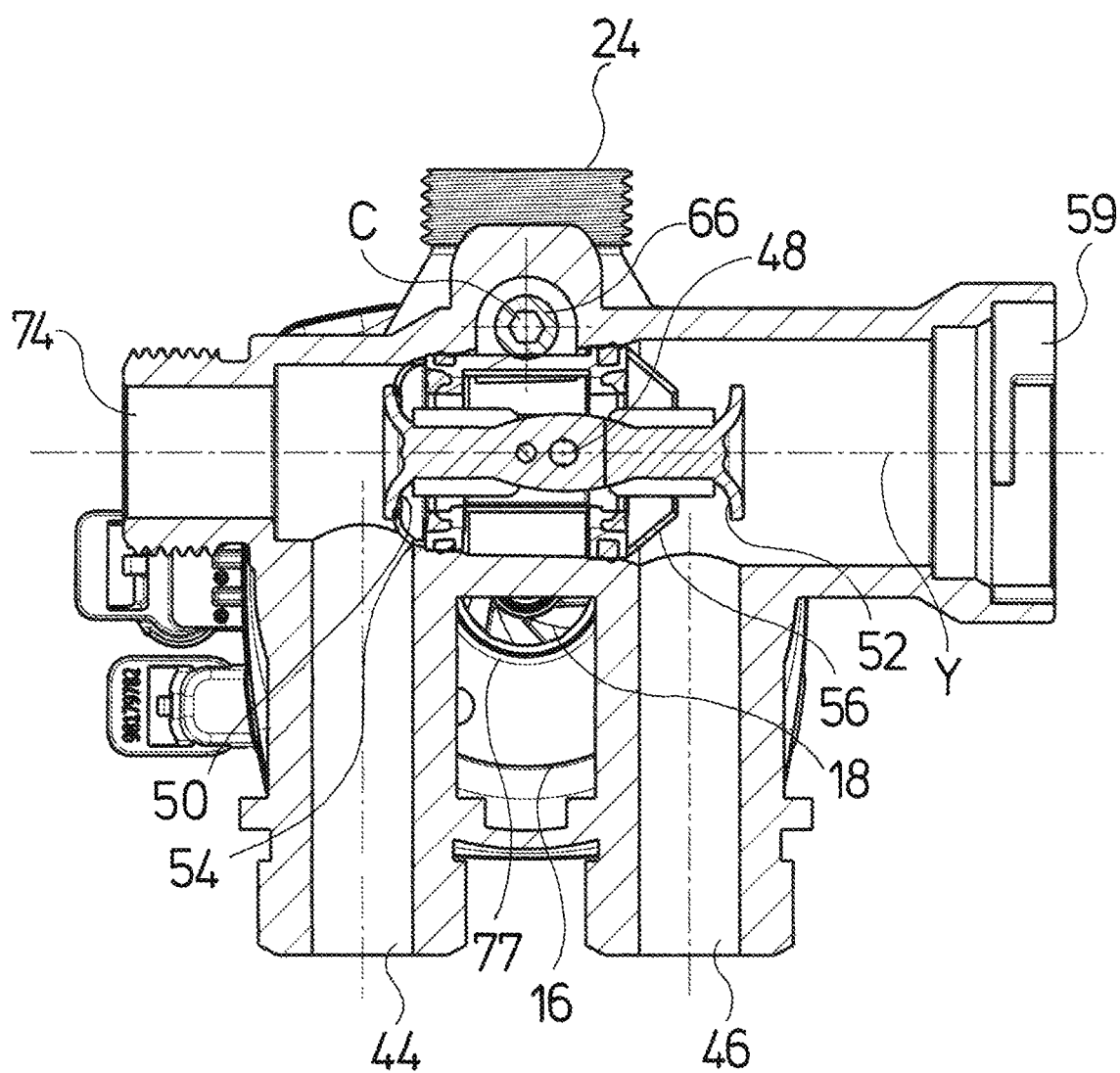
FIG. 11 is a sectional view according to FIG. 10, wherein the valve element is situated in a first switch position.

FIG. 9 shows an idle position of the flap 62, in which this extends essentially radially to the rotation axis D of the impeller 18. It is to be recognized that here too, the flap 62 is situated completely outside the free annular space 22, as with the flap 34, which is to say with its radially inner end is distanced just as far from the outer periphery of the impeller 18 as the inner wall of the pump casing 16 in the peripheral region of the impeller 18. In this position, the valve element 48 of the valve 10 which is essentially configured as with the first embodiment example is situated in the middle position which is shown in FIG. 10 and in which the sealing surface 52 is lifted from the valve seat 56, and the sealing surface 50 from the valve seat 54. Thus firstly both inlet channels 44 and 46 are opened in this position. If the impeller 18 is driven in the rotation direction B, then the flap 60 pivots in the direction b as described, until it comes to bear on the wall of the outlet channel 24, preferably amid elastic deformation. The valve element 48 by way of this and via the lever arm 70 is displaced into the switch position which is shown in FIG. 11 and in which the sealing surface 50 comes to sealingly bear on the valve seat 54. The inlet channel 44 which is connected to the heating circuit 5 is closed by way of this. As described above, the delivery-side pressure of the pump assembly 12, via the inlet channel 44 now likewise acts upon the end-face of the valve element 48 at the rear side of the sealing surface 50, so that the valve element 48 is relocated further in the axial direction amid elastic deformation of the valve seat 54. The flap 60 on contacting the wall of the outlet channel 24 springs back again when the pump assembly is switched off, on account of an elastic deformation. The relaxation of the sealing seat 54 also effects a restoring force.

Figure 12:
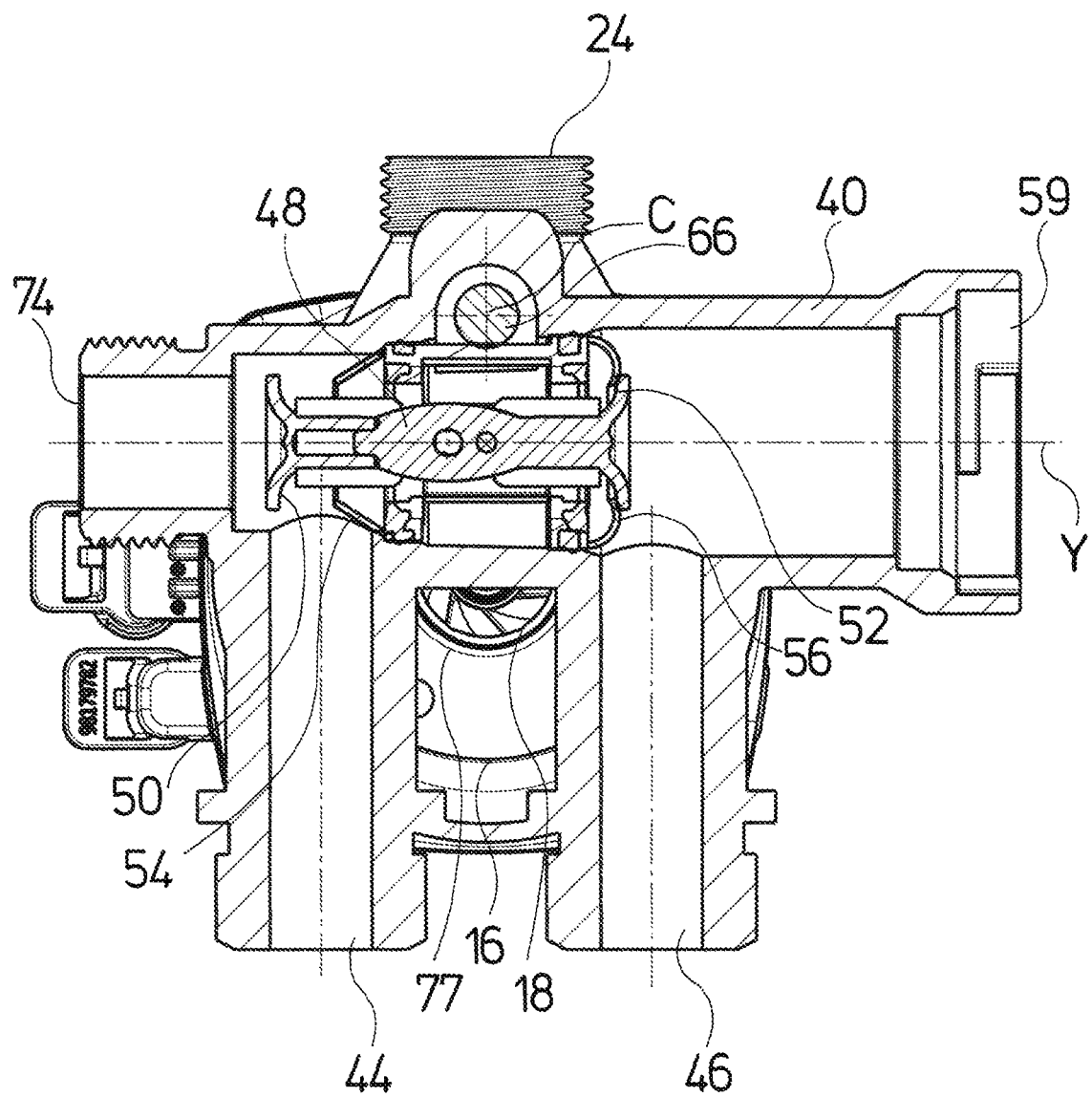
FIG. 12 is a sectional view according to FIGS. 10 and 11, wherein the valve element is situated in a second switch position.

If the impeller is driven in the opposite rotation direction A, then the flap 60 as described pivots in the direction a until it comes to bear on the wall of the outlet channel 24, and the valve element 48 is moved in the second switch position which is shown in FIG. 12 and in which the sealing surface 50 is lifted from the valve seat 54, and the sealing surface 52 of the valve element 48 comes to bear on the sealing seat 56. The inlet channel 46 is closed by way of this, whereas the inlet channel 44 is opened. The flow path through the heating circuit 5 is therefore opened, and the flow path through the circuit 7 and the secondary heat exchanger 8 is closed. The delivery-side pressure now prevails at the inlet channel 46 by way of the circuit 7, so that this pressure acts upon the axial face end of the valve element 48 at the rear side of the sealing surface 52 and pushes the sealing surface 52 against the valve seat 56, wherein this is compressed in the described manner. A self-holding function of the valve 10 is thus also always given, even with this embodiment example, since the valve element 48 for closure must always be moved such that the sealing surfaces 50, 52 are moved in the respective flow direction, so that the pressure acting in the flow direction in the inlet channels 44 and 46 in each case holds the sealing surfaces in contact on the associated valve seat 54, 56 when the respective valve seat 54, 56 is closed by the associated sealing surface 50, 52.

The suction port or run-in 77 (see FIGS. 10 to 12) of the impeller 18, with all the embodiment examples described here preferably has a diameter between 12 and 30 mm, further preferably between 12 and 25 mm, whereas the radius r1 of the impeller 18 preferably lies between 12 and 30 mm.

While specific embodiments of the invention have been shown and described in detail to illustrate the application of the principles of the invention, it will be understood that the invention may be embodied otherwise without departing from such principles.

The invention claimed is:

1. A pump assembly comprising:
an electrical drive motor driveable in two rotation directions;
at least one impeller connected, for rotation, to the electrical drive motor;
a drive element subjected to flow produced by the at least one impeller; and
at least one valve situated in an inlet of the pump assembly and the at least one valve comprises a valve element which is movable between at least two switch positions and, for movement thereof is connected to the drive element, wherein the valve element, in at least a first switch position of the at least two switch positions, closes an inlet channel of the pump assembly and the valve element is arranged such that a movement direction into the first switch position corresponds to a flow direction through the inlet channel, wherein the valve element is configured to move in the flow direction through the inlet channel to close the inlet channel, wherein the valve element is linearly movable along a longitudinal axis of the valve element between the at least two switch positions based on a pivoting movement of the drive element, the drive element comprising an onflow surface which is situated in an outlet channel of a pump casing surrounding the at least one impeller, wherein the onflow surface is formed by a flap which is pivotable about a pivot axis, and the flap is coupled to the valve element for movement thereof, wherein at least one sealing surface of the valve element, or one of a first valve seat and a second valve seat, on which the valve element comes to bear or both at least one sealing surface and the one of the first valve seat and the second valve seat, are configured such that the valve element can move further by a certain amount in the movement direction after contact on the one of the first valve seat and the second valve seat.

2. The pump assembly according to claim 1, wherein the inlet channel is a first inlet channel and the pump assembly further comprising a second inlet channel, and the at least one valve is configured as a switch-over valve between the two inlet channels.

3. The pump assembly according to claim 2, wherein the valve element in the first switch position of the at least two switch positions closes the first inlet channel and in a second switch position of the at least two switch positions closes the second inlet channel, and that the valve element is arranged such that the movement direction into the first switch position corresponds to the flow direction through the first inlet channel and a movement direction into the second switch position corresponds to a flow direction through the second inlet channel.

4. The pump assembly according to claim 2, wherein the valve element comprises another sealing surface to provide two sealing surfaces and the first valve seat is situated in the first inlet channel and the second valve seat is situated in the second inlet channel, wherein the two valve seats are spaced apart from one another.

5. The pump assembly according to claim 1, wherein the valve element is connected to the drive element such that the drive element is movable by way of movement of the valve element.

6. The pump assembly according to claim 1, wherein the flap is arranged in the outlet channel of the pump casing such that the flap is subjected to the flow produced by the at least one impeller, on a first surface given a first rotation direction of the drive motor, and on a second surface, which is away from the first surface, given a second, opposite rotation direction of the drive motor.

7. The pump assembly according to claim 1, wherein the pivot axis of the flap extends parallel to a rotation axis of the at least one impeller.

8. The pump assembly according to claim 1, wherein the outlet channel comprises a first outlet channel section and a second outlet channel section which are directed to the at least one impeller such that with a first rotation direction of the drive motor, the flow which is produced by the at least one impeller is guided essentially into the first outlet channel section, and with a second opposite rotation direction of the drive motor, the flow produced by the at least one impeller is guided essentially into the second outlet channel section, wherein the pivotable flap is arranged in the first or the second outlet channel section.

9. The pump assembly according to claim 8, wherein the first and second outlet channel sections are separated by a separating wall.

10. The pump assembly according to claim 1, wherein the valve element and the drive element have a defined idle position, wherein restoring means are present, which restoring means subjects the drive element or the valve element or both the drive element and the valve element to a force directed into the idle position.

11. The pump assembly according to claim 1, wherein the at least one impeller is arranged in the pump casing, and the valve element is arranged in a valve housing, wherein the drive element is arranged in the pump casing and the drive element is coupled to the valve element via at least a lever, for transmitting force.

12. The pump assembly according to claim 1, wherein the at least one impeller is arranged in the pump casing having an inner radius in a peripheral region of the at least one impeller that is at least 1.4 times as large as a radius of the at least one impeller.

13. The pump assembly according to claim 1, wherein the at least one impeller comprises arcuate blades which are arcuate in two directions, wherein the blades have a curvature which is adapted to a rotation direction, in which the at least one impeller is operated.

14. A hydraulic system comprising:
at least two hydraulic circuits; and
a pump assembly comprising:
an inlet channel;
an electrical drive motor driveable in two rotation directions;
at least one impeller connected, for rotation, to the electrical drive motor;
a drive element subjected to flow produced by the at least one impeller; and
at least one valve situated in an inlet of the pump assembly and the at least one valve comprises a valve element which is movable between at least two switch positions and, for movement thereof is connected to the drive element, the at least two switch positions comprising a first switch position and a second switch position, wherein the valve element is configured to move from the second switch position in a flow direction through the inlet channel to the first switch position to close the inlet channel of the pump assembly in the first switch position, wherein the at least one valve is configured as a switch-over valve, by way of which the flow path for a fluid delivered by the pump assembly can be switched between the at least one two hydraulic circuits, wherein the valve element is linearly movable in a longitudinal direction of the valve element between the at least two switch positions based on a pivoting movement of the drive element, the drive element comprising an onflow surface which is situated in an outlet channel of a pump casing surrounding the at least one impeller, wherein the onflow surface is formed by a flap which is pivotable about a pivot axis, and the flap is coupled to the valve element for movement thereof, wherein at least one sealing surface of the valve element, or one of a first valve seat and a second valve seat, on which the valve element comes to bear or both at least one sealing surface and the one of the first valve seat and the second valve seat, are configured such that the valve element can move further by a certain amount in a movement direction after contact on the one of the first valve seat and the second valve seat.

15. The hydraulic system according to claim 14, wherein the inlet channel is a first inlet channel and the pump assembly further comprising a second inlet channel.

16. The hydraulic system according to claim 15, wherein the valve element in the first of the two switch position closes the first inlet channel and in the second switch position closes the second inlet channel, and that the valve element is arranged such that the movement direction into the first switch position corresponds to the flow direction through the first inlet channel and a movement direction into the second switch position corresponds to a flow direction through the second inlet channel.

17. A pump assembly comprising:
an electrical drive motor driveable in two rotation directions;
an impeller connected, for rotation, to the electrical drive motor;
a drive structure, at least a portion of the drive structure being subjected to flow produced by the impeller;
a pump casing surrounding at least a portion of the impeller, the pump casing comprising an outlet channel; and
a valve situated in an inlet of the pump assembly and the valve comprises a valve element which is movable between at least two switch positions and, for movement thereof is connected to the drive structure, wherein the valve element, in at least a first switch position of the at least two switch positions, closes an inlet channel of the pump assembly and the valve element is arranged such that a movement direction into the first switch position corresponds to a flow direction through the inlet channel, the drive structure comprising a flap portion and a lever portion, the flap portion being pivotable about a pivotable axis, the flap portion comprising an onflow surface arranged in the outlet channel, the lever portion being in contact with the valve element for movement thereof, wherein the valve element is configured to be linearly movable along a longitudinal axis of the valve element between the at least two switch positions based on pivoting movement of the drive structure, wherein at least one sealing surface of the valve element, or one of a first valve seat and a second valve seat, on which the valve element comes to bear or both at least one sealing surface and the one of the first valve seat and the second valve seat, are configured such that the valve element is movable further by a certain amount in the movement direction after contact on the one of the first valve seat and the second valve seat and the flap portion is configured to move based on the certain amount of movement of the valve element in the movement direction after the valve element contacts the one of the first valve seat and the second valve seat.

18. The pump assembly according to claim 17, further comprising:
a valve housing arranged adjacent to the pump casing, the valve being arranged in the valve housing, wherein the lever portion is arranged in the valve housing, the longitudinal axis being non-parallel to the pivotable axis.

19. The pump assembly according to claim 17, wherein the valve element comprises a first sealing surface and a second sealing surface, the first sealing surface being arranged at one end of the linearly movable valve element and the second sealing surface being arranged at another end of the valve element, the valve element comprising a first valve element portion and a second valve element portion, the first valve element portion and the second valve element portion defining a valve element opening, wherein at least a portion of the drive element portion is arranged in the valve element opening.

20. The pump assembly according to claim 17, wherein the flap portion is configured to move out of a flow of fluid in the outlet channel based on the certain amount of movement of the valve element in the movement direction after the valve element contacts the one of the first valve seat and the second valve seat.

* * * * *